United States Patent

[11] 3,596,216

[72] Inventor Raymond I. Walsh
Prospect Heights, Ill.

[21] Appl. No. 848,237
[22] Filed Aug. 7, 1969
[45] Patented July 27, 1971
[73] Assignee Motorola, Inc.
Franklin Park, Ill.

[54] TUNER MECHANISM
18 Claims, 7 Drawing Figs.

[52] U.S. Cl. ........................................................ 334/7,
325/459, 334/10, 334/19, 334/50, 334/85, 334/88
[51] Int. Cl. ........................................................ H03j 5/06,
H03j 5/08
[50] Field of Search ............................................ 334/1, 7,
10, 15, 19, 23, 42, 49—51, 85, 88; 325/458, 459

[56] References Cited

UNITED STATES PATENTS

| | | | |
|---|---|---|---|
| 2,419,968 | 5/1947 | Roberts | 334/49 X |
| 2,423,152 | 7/1947 | Mitchell | 334/49 X |
| 2,798,955 | 7/1957 | Balash | 334/50 X |
| 3,206,699 | 9/1965 | Didier et al. | 334/49 X |
| 3,226,663 | 12/1965 | Eland et al. | 334/49 |
| 3,290,604 | 12/1966 | Bell | 334/50 X |

*Primary Examiner*—Eli Lieberman
*Assistant Examiner*—Saxfield Chatnion
*Attorney*—Mueller, Aichele and Rauner

ABSTRACT: A pushbutton tuning mechanism for an AM-FM radio receiver includes a cylindrical turret capable of being rotated about a central longitudinal axis to a selected one of several discrete positions, with a linear potentiometer for the AM band and a linear potentiometer for the FM band being mounted for rotation with the turret at each of the positions. Selection of an AM-FM switch engages a clutch mechanism with the drive means for the potentiometers at the selected position to effect tuning of the radio receiver accordingly. A plurality of pushbuttons are provided, and the depression of a pushbutton causes the turret to be rotated to the position corresponding to that pushbutton, so that the two potentiometers (AM and FM) associated with that position control the tuning of the radio receiver.

INVENTOR.
RAYMOND I. WALSH
BY Mueller, Aichele & Rauner
ATTORNEYS.

INVENTOR
RAYMOND I. WALSH
BY Mueller, Aichele & Rauner
ATTORNEYS

INVENTOR.
RAYMOND I. WALSH

BY Mueller, Aichele & Rauner
ATTORNEYS.

INVENTOR
RAYMOND I. WALSH

BY Mueller, Aichele & Rauner

ATTORNEYS.

TUNER MECHANISM

BACKGROUND OF THE INVENTION

The use of voltage-variable diode-capacitors, such as varactor diodes, permits the electronic tuning of radio receivers and television receivers by the use of DC control voltages; so that the tuning elements no longer need to be intimately associated with the tuner. Thus, the tuned circuits of the radio receivers may be located remotely from the devices used to provide the necessary DC tuning voltages. In addition, the compact size of the voltage-variable diode-capacitor tuning circuits makes it desirable to use such tuning circuits in many radio applications which formerly used mechanically adjusted variable capacitors or the like as the tuning elements.

To employ voltage-variable diode capacitors in pushbutton radios, however, especially in multiband pushbutton radios, a problem exists in providing a "memory," so that operation of a pushbutton will provide consistent tuning of the radio receiver to the station which is to be selected by that pushbutton. In addition it is necessary to provide some means for providing the initial tuning of the radio receiver for each pushbutton location in a manner which is reliable and inexpensive.

SUMMARY OF THE INVENTION

Accordingly, it is an object of this invention to provide an improved tuning system for supplying preselected tuning potentials to a multiband receiver having electronic tuning circuits therein.

It is another object of this invention to provide a turret tuner for an electronically tuned radio receiver in which each position of the turret presents a different potentiometer which may be adjusted to supply the proper tuning voltage to the receiver for that turret position.

It is an additional object of this invention to provide a turret tuner for a multiband radio receiver in which each position of the turret carries a tuning element in the form of a linear potentiometer for each of the bands to which the radio receiver may be tuned, and wherein a band selection switch effects selection of the proper tuning potentiometer for each position of the tuner.

It is still another object of this invention to provide a pushbutton tuner for a radio receiver in which a pair of potentiometers are associated with each pushbutton, and operation of a pushbutton selects the potentiometers associated with that pushbutton so that preselected tuning of the radio receiver can be effected.

In accordance with a preferred embodiment of this invention, a multichannel wave signal receiver has a rotatable turret which may be rotated to several discrete positions corresponding to the different stations to which the receiver may be tuned. At least one group of tuning elements are mounted for rotation with the turret, with one element of the group being associated with each rotational position of the turret. Another group of tuning elements also may be provided, with one tuning element of this other group also being associated with each rotational position of the turret. An adjusting means is provided for each of the tuning elements and additional control means at a fixed position relative to the turret is used for adjusting the adjusting means presented to the control means upon rotation of the turret to the fixed position.

In other embodiments of the invention, the tuning mechanism is utilized as part of a pushbutton receiver, and operation of a particular pushbutton causes the turret to rotate to a predetermined position corresponding to that pushbutton. The tuning elements associated with that position form a "memory" for tuning of the radio receiver upon operation of each pushbutton.

DETAILED DESCRIPTION

Figure 1:
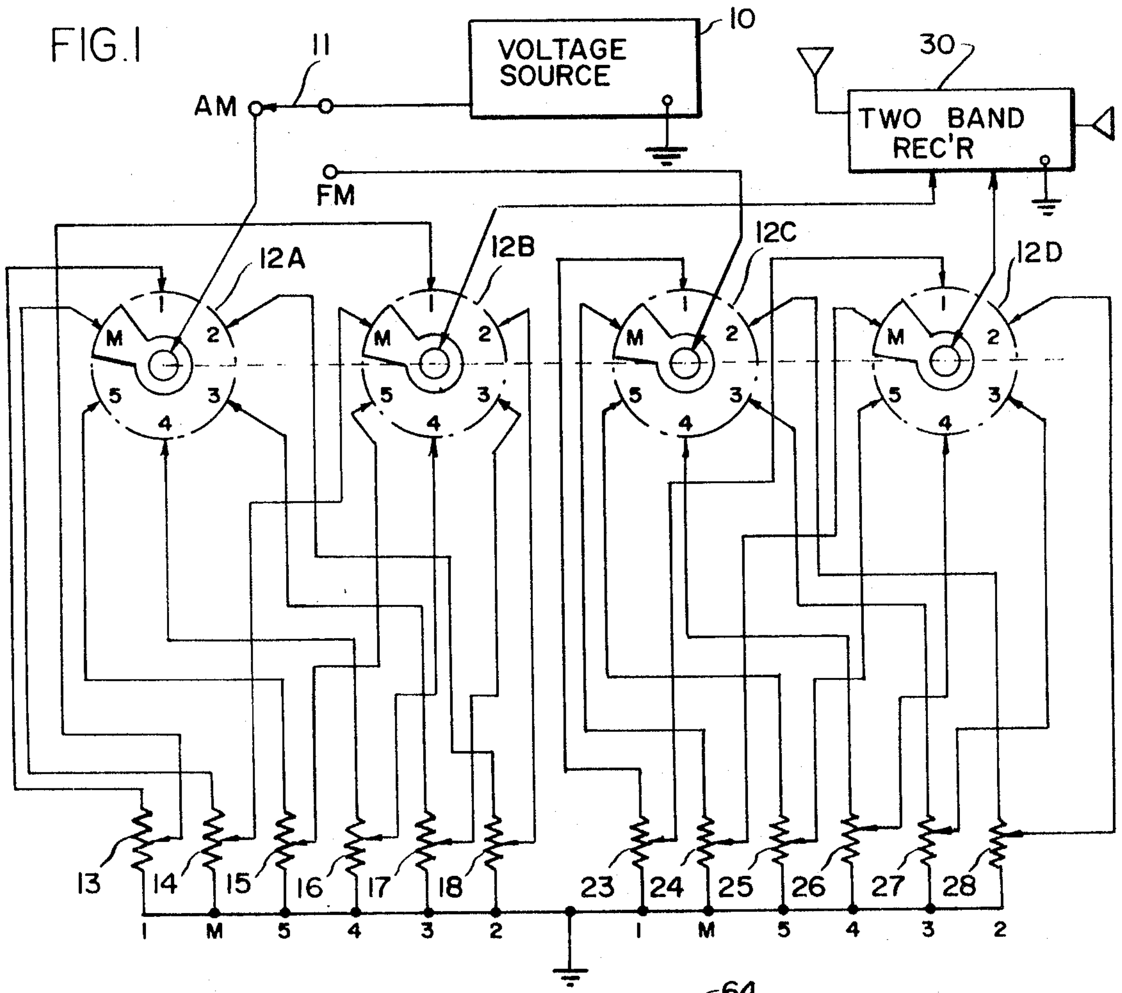
FIG. 1 is a schematic diagram of a multiband electronic tuning control circuit in accordance with a preferred embodiment of this invention.

Referring now to the drawings, wherein like reference numerals are used throughout the several views to designate the same or similar elements, there is shown in FIG. 1 a circuit which may by utilized in conjunction with a multiband (AM-FM) radio receiver of the type employing voltage responsive devices, such as varactor diodes, in the tuning circuits thereof. The circuit shown in FIG. 1 is utilized to provide predetermined tuning voltages to the tuning circuits of the radio receiver. As shown in FIG. 1, the voltage source 10 for the tuning control circuit is connected to a band selection switch 11, which may be set to either and AM or FM position. As shown in FIG. 1, this switch is set to the AM position, causing a DC potential to be applied to the common terminal of the first bank 12A of a four bank six-position stepping switch 12. The wipers of the four banks 12A, 12B, 12C, and 12D are interconnected to move together and make an electrical contact between the common terminals of each of the banks and a selected one of the six terminals associated with each of the six positions of the stepping switch 12.

As shown in FIG. 1, the wiper of bank 12A is shown making an electrical connection to a terminal connected to a potentiometer 14, the tap of which is also connected to the corresponding wiper of bank 12B. The common terminal of the bank 12B then supplies the desired tuning voltage to a two-band (AM-FM) radio receiver 30. Different positions of the stepping switch 12 cause different ones of six potentiometers or tuning elements 13 to 18 to be connected to the common terminal of the stepping switch bank 12B to apply different potentials to the radio receiver 30 in accordance with the selected settings of the potentiometers 13 to 18.

With the band select switch 11 placed in the FM position, a comparable interconnection of the stepping switch bank 12C, through one of six potentiometers or tuning elements 23 to 28, to the stepping switch bank 12D is made. The output of the stepping switch bank 12D is applied over a different lead to the receiver 30; so that within the receiver 30, proper differentiation between the AM and the FM tuning voltages takes place. Since the manner in which tuning by means of voltage variable tuning elements, such as varactor diodes, is well known, no details of the tuning circuits of the radio receiver 30 have been shown. It is apparent that the tuning voltages applied to the radio receiver 30 will vary in accordance with the settings of the potentiometers 13 to 18 and 23 to 28, the particular position of the wipers of the banks of the stepping switch 12, and in accordance with the position of the band-select switch 11.

In the foregoing description, the operation of the stepping switch 12 indicated that the wipers moved relative to fixed terminals connected to the potentiometers 13 to 18 and 23 to 28. It should be noted that the wipers could occupy a fixed position and that the potentiometers, and the terminals connected thereto, could be rotated to provide the same results. This latter mode of operation is the one which is used in the mechanism to be described hereinafter.

Figure 2:
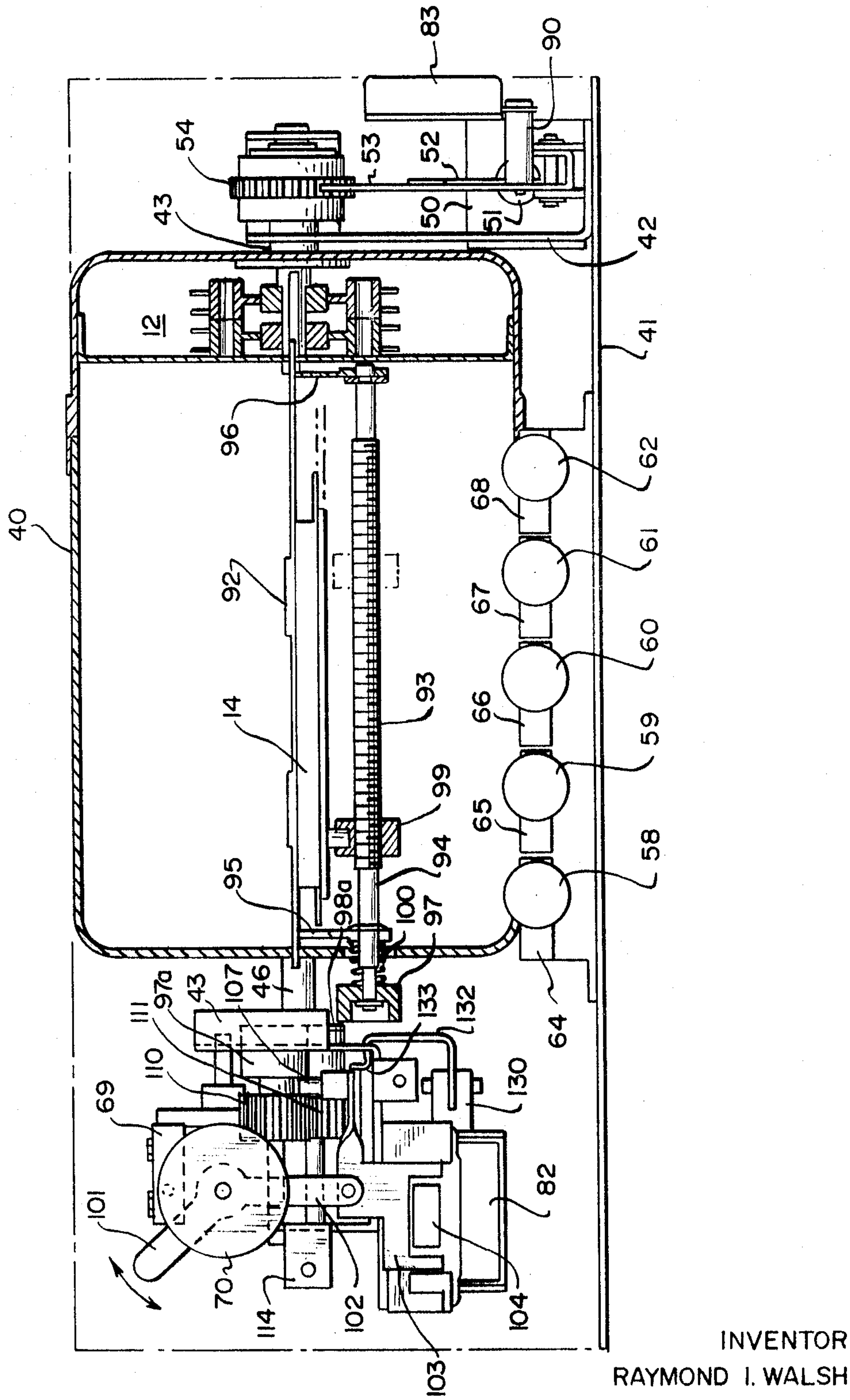
FIG. 2 is a partially cutaway front view of a tuning mechanism used to control the tuning circuit in FIG. 1.
Figure 3:
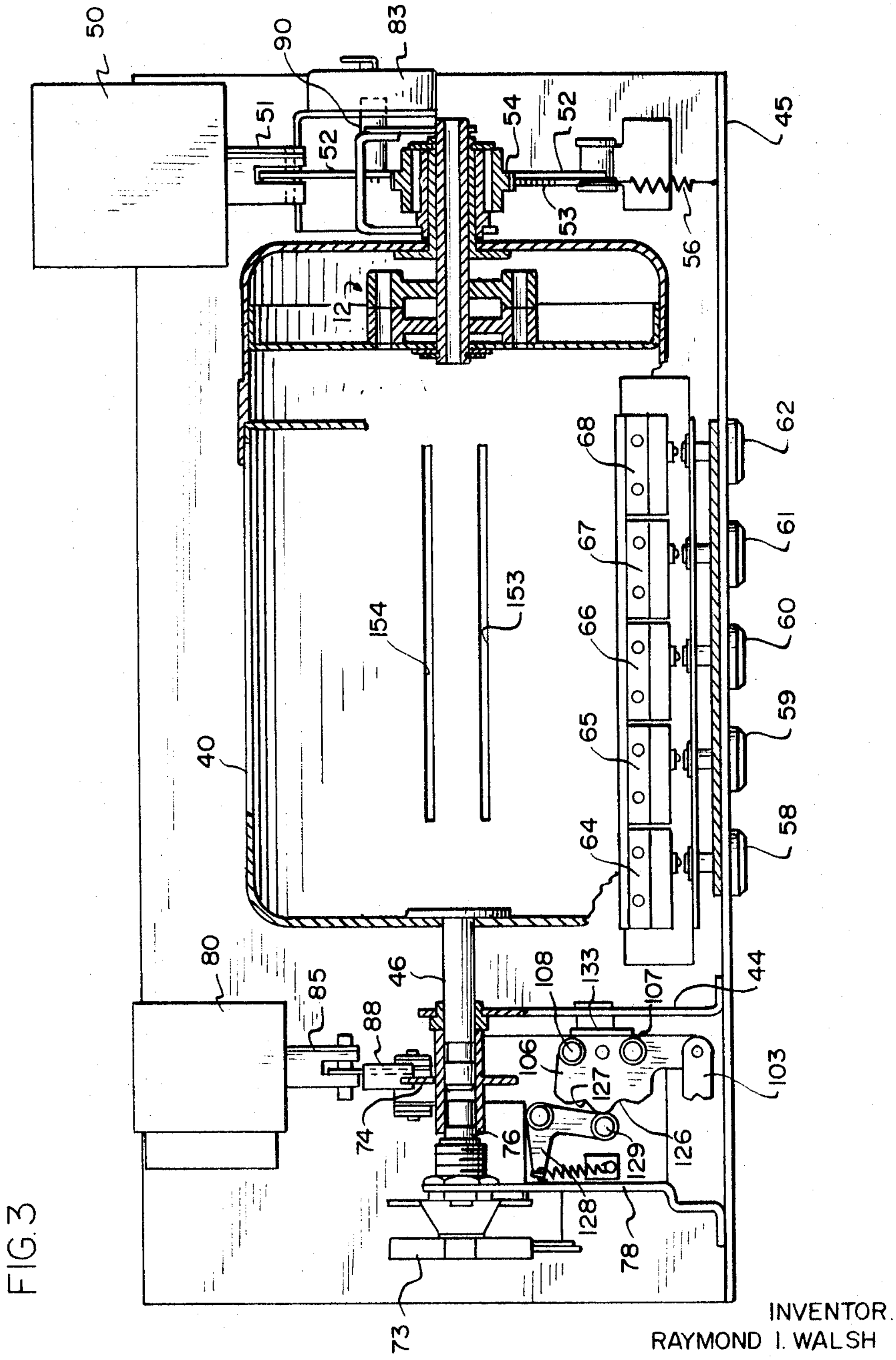
FIG. 3 is a partially cutaway top view of the tuning mechanism shown in FIG. 2.

In FIGS. 2 to 7, there is shown a turret-type of tuning mechanism which may be used to adjust the setting of the potentiometers 13 to 18 and 23 to 28, and to control the relative positions of the wipers of the stepping switch 12 and the potentiometers. In FIGS. 2 and 3 there are shown, respectively, partially cutaway front and top views of a tuning control mechanism having a turret housing 40, in the form of a split can, in which the potentiometers 13 to 18 and 23 to 28 are mounted and housed. For clarity, only a single potentiometer 14 is shown in FIG. 2. The turret housing 40 is supported within a suitable frame having a base 41, with an end support bracket 42 being attached to the base 41 to provide a support for a shaft 43 connected to one end of the turret housing 40. The other end of the turret housing 40 is supported by an end support bracket 44, which is attached to a front plate 45 of the frame and supports a shaft 46 connected to the other end of the turret housing. These support brackets 42 and 44 locate the turret for rotation within the frame housing the radio receiver tuning mechanism.

The stepping switch 12 is located in one end of the turret housing and coaxially with the shaft 43. Since the details of this switch have been shown in FIG. 1, no details are presented in FIGS. 2 and 3 with the switch location merely being indicated in these figures. It should be noted however, that the wipers of the switch banks 12A to 12D are stationary relative to the rotation of the turret, with the potentiometers and their associated stepping switch contacts being moved. The operation, however, is the same as if the wipers were being moved and the contacts were stationary.

In order to rotate the turret housing 40, and the potentiometers carried within, to preselected positions, an indexing solenoid 50 (most clearly seen in FIGS. 3 and 5) is provided, with its armature 51 being connected to a lever 52 pivotally mounted to the bottom 41 of the frame. The upper portion of the lever 52 is in the form of a rack gear 53 and is spring-biased by a return spring 56 toward the front side 45 of the frame. The spring 56 also provides the force for returning the armature 51 to the position shown in FIG. 5 whenever the indexing solenoid 50 is released.

Figures 5, 6, 7:
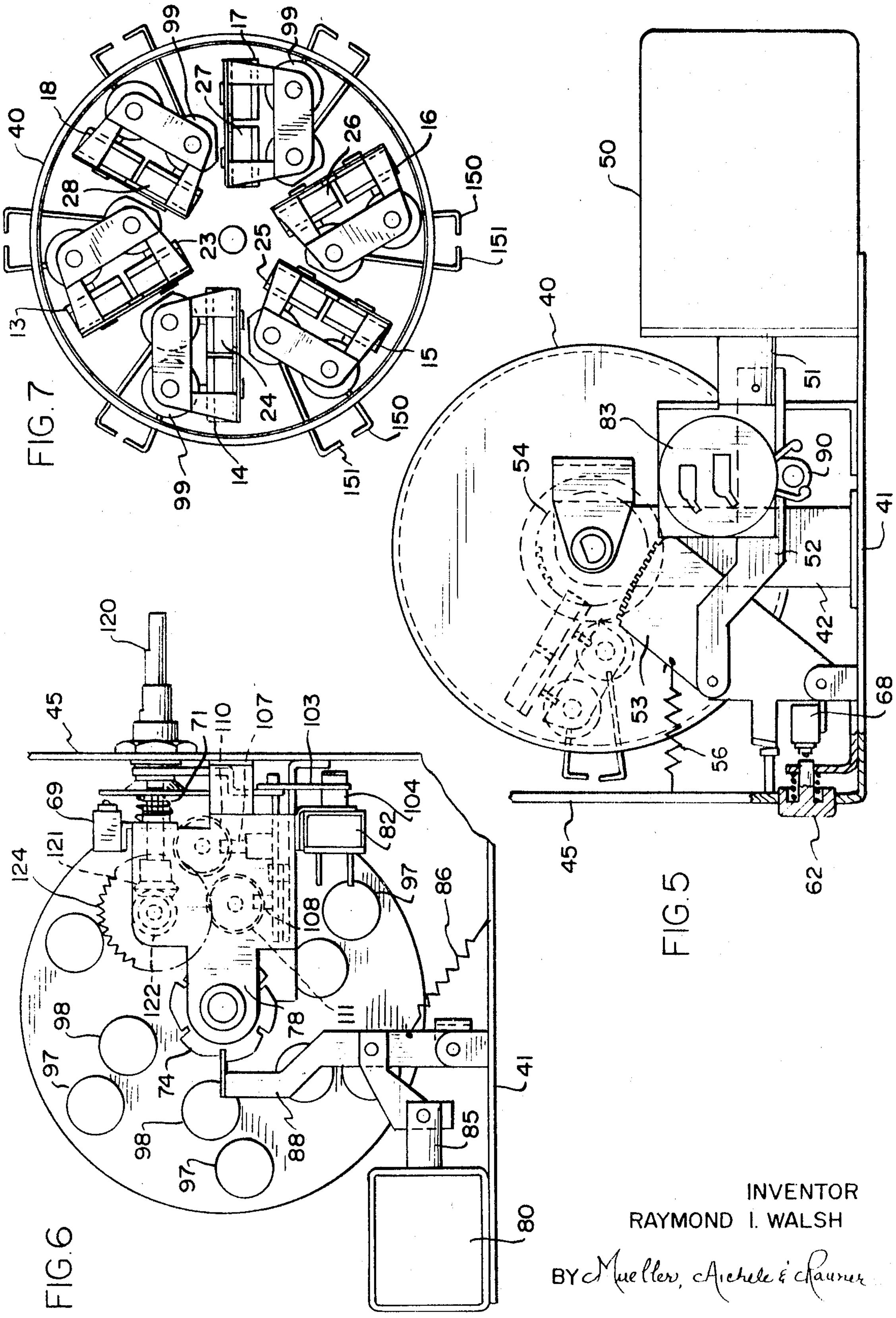
FIG. 5 is an end view of the tuning mechanism shown in FIGS. 2 and 3.
FIG. 6 is a view of the other end of the tuning mechanism shown in FIGS. 2 and 3.
FIG. 7 is an end view showing the location of the tuning elements within the tuning mechanism shown in FIGS. 2 and 3.

Energization of the solenoid 50 causes the armature 51 to be drawn into the solenoid, which in turn causes the rack gear 53 to rotate in a clockwise direction as viewed in FIG. 5. The teeth of the rack gear 53 engage the teeth of a pinion 54, which is connected through a one-way clutch to the shaft 43 attached to the turret housing 40. Thus, energization of the indexing solenoid 50 causes the pinion 54 to rotate the turret housing 40 in a counterclockwise direction (as viewed in FIG. 5) through the shaft 43 by a predetermined amount, which has been established as 60° in the embodiment shown in the drawings. When the indexing solenoid 50 is released the rack gear 53 returns to the position shown in FIG. 5, rotating the pinion 54 in a clockwise direction, but the one-way clutch permits the clockwise rotation of the pinion gear 54 without imparting any rotational motion to the shaft 43 and the turret housing 40.

In FIGS. 2 and 3 there are shown five pushbuttons 58 to 62 for controlling five corresponding microswitches 64 to 68. The pushbuttons 58 to 62 and the switches 64 to 68 constitute a pushbutton selection circuit which is used to control the rotational position of the turret housing 40 to locate predetermined ones of the potentiometers 13 to 18 and 23 to 28 in a position for controlling the two-band radio receiver 30 in accordance with the selected position of the band select switch 11. In addition to the microswitches 64 to 68, a further microswitch 69 is provided to be engaged by depression of the shaft 120 of the manual tuning thumb wheel 70 against the action of a compression biasing spring 71, which most clearly can be seen in FIG. 6. The microswitch 69 operates in the same manner as the microswitches 64 to 68 to control the rotational position of the turret housing 40 to position corresponding potentiometers in the manner shown in FIG. 1 to control the tuning of the radio receiver 30 in accordance with the settings of the potentiometer taps.

In FIG. 3 there is shown a turret position selection switch 73 which is mounted for rotation with the shaft 46 through a coupling effected by a ratchet wheel 74 interconnecting a shaft 76 of the turret position selection switch 73 with the shaft 46. The switch 73 (as seen in FIG. 3) is mounted on a support bracket 78 which in turn is attached to the front plate 45 of the frame housing the tuning selection mechanism.

Figure 4:
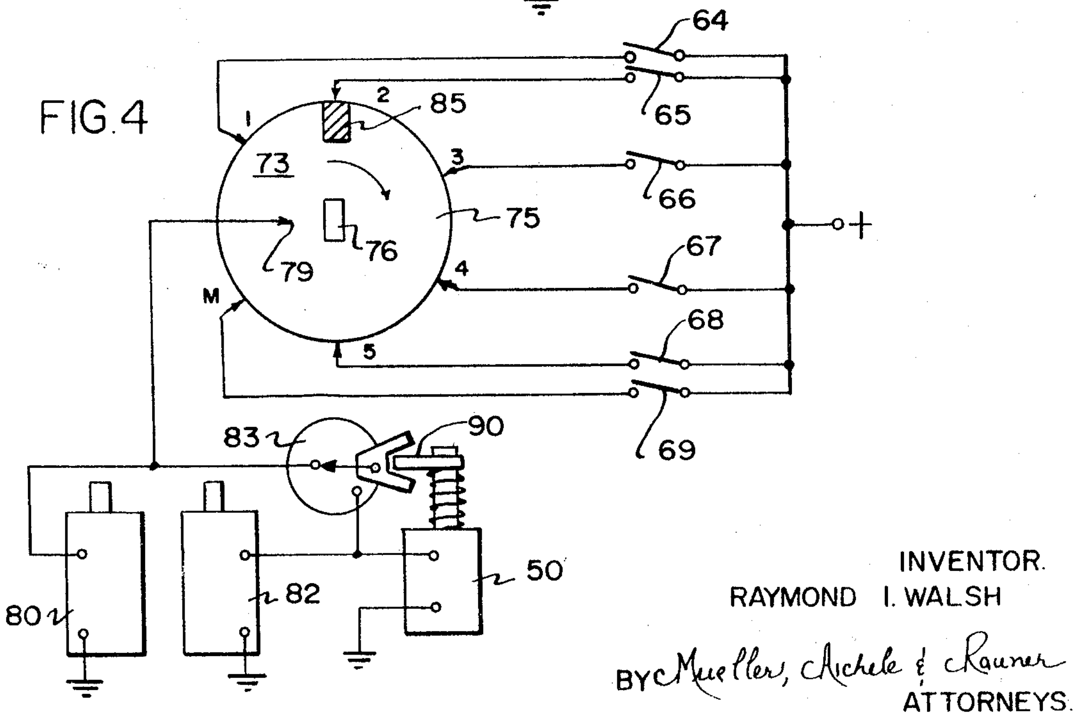
FIG. 4 is a circuit diagram of a control circuit to be used in association with the mechanism in FIGS. 2 and 3.

FIG. 4 is a circuit diagram of the turret position selection switch 73 and the microswitches 64 to 69. One terminal of each of the microswitches 64 to 69 is connected in common to a source of positive potential, and the other terminal of each of the microswitches is connected to a different terminal or brush located about the periphery of a circular or cylindrical common conductive terminal 75 of the turret position selection switch 73. This common terminal rotates with the shaft 76 which is shaped and fitted into a rectangular opening of the common terminal of the switch 73. The brushes attached to each of the other terminals of the switches 64 to 69 are located to 60° angles with respect to one another, thus corresponding to each 60° increment of movement of the turret housing 40 causes by each operation of the indexing solenoid 50.

A common terminal or brush 79 is provided for the switch 73 and is connected directly to a detent solenoid 80 and to a clutch release solenoid 82 and the indexing solenoid 50 through an indexing switch 83. Electrical contact from each of the brushes associated with each of the microswitches 64 to 69, with the exception of one, is provided with the common terminal 79 of the position selection switch 73. A nonconductive portion 85, however, is provided in the periphery of the cylindrical conductive terminal 75 to the switch 73 and underlies one of the brushes associated with one of the contacts of the microswitches 64 to 69. At any given time, only one of the microswitches 64 to 69 is closed by depression of its associated pushbutton or by depression of the thumb wheel 70 for the manual microswitch 69.

Assume for purposes of illustration that the pushbutton 61 associated with the microswitch 67 is depressed to close the microswitch 67. In FIG. 4 this then completes a path from the source of positive potential through the brush connected to the microswitch 67, the conductive terminal 75, and the common brush 79 to energize the detent solenoid 80. As most clearly seen in FIG. 6, energization of the detent solenoid 80 causes movement of an armature 85 against the biasing action of a return spring 86 to pivot a detent lever 88 counterclockwise (as viewed in FIG. 6) and out of engagement with the teeth of the detent ratchet wheel 74. The shaft 46 and the turret 40 thus are freed for rotational movement.

At the same time, an operating path is completed through the contact of the indexing switch 83 to energize the clutch release solenoid 82 and the indexing solenoid 50. The operation of the clutch release solenoid will be discussed later, but the operation of the indexing solenoid 50 causes the turret housing 40 to be rotated 60° in the manner described previously. Since the turret position selection switch 73 is attached through the shaft 76 and the ratchet wheel 74 for rotation with the turret housing 40, the nonconductive portion 85 is moved 60° in the direction of the arrow shown in FIG. 4 to underlie the brush connected to the second terminal of the microswi ch 66.

Energization of the indexing solenoid also causes movement of a switch actuator 90, which is attached to the lever 52, to operate a pivoted switch in the indexing switch 83 to open the contacts thereof. This then causes release of the indexing solenoid 50 and the clutch release solenoid 82. The detent solenoid 80, however, continues to remain energized since a conductive path still is completed through the closed switch 67 and the common brush 79 of the switch 73. As a result, a second operation of the indexing solenoid 50 and clutch release solenoid 82 takes place, causing a further 60° rotation of the turret housing 40.

This second operation of the indexing solenoid 50 then causes the nonconductive portion 85 to underlie the brush connected to the second contact of the microswitch 67, so that the conductive path between the switch 67 and the common brush 79 is broken. Since all of the other microswitches 64 to 69 are open at this time, the detent solenoid 80 is released along with the indexing solenoid 50 and clutch release solenoid 82, and the turret 40 is locked against any further rotation by the action of the detent pawl on the detent lever 88 engaging a tooth on the detent wheel 74.

In order to effect control of the settings of the potentiometers 13 to 18 and 23 to 28, the potentiometers are mounted for rotation with the housing 40 in a manner shown most clearly in FIG. 7, with the potentiometers 13 to 18 each being associated with the corresponding potentiometers 23 to 28 in six pairs of potentiometers, each pair being located 60° from the next adjacent pair about the axis of rotation of the turret housing 40. Each of the pairs of potentiometers are mounted on an internal frame member 92 which is affixed to walls of the turret housing 40 to locate each of the pairs of potentiometers within the housing in a fixed relation.

Adjustment of the potentiometers is effected by means of a lead screw 93 (most clearly seen in FIG. 2) which is rotated through a shaft 94 extending through an opening in the left end of the turret housing 40, as viewed in FIG. 2, with the shaft 94 being supported by support members 95 and 96 located at each end thereof and attached to the frame 92. A clutch plate 97 is mounted with the shaft 94 of each of the potentiometers 13 to 18 to rotate therewith but is resiliently mounted axially of the shaft 94 in order to provide firm engagement with a corresponding clutch plate associated with the potentiometer adjustment mechanism of the tuner. Corresponding clutch plates 98 are similarly attached to corresponding shafts 94 associated with the potentiometers 23 to 28.

Rotation of a clutch plate 97 or 98 causes rotation of the corresponding shaft 94 and lead screw 93 of the associated potentiometer. This results in linear movement of a tuning nut 99 which is driven by the lead screw 93 to travel along the associated linear potentiometer in accordance with the direction of rotation of the lead screw 93 in a manner which is well known in the art. The tuning nut 99 is attached to the adjustable tap of the potentiometer, so that adjustment of the potentiometer is effected by rotation of the corresponding clutch plate 97 or 98.

Cooperating with the driven clutch plates 97 and 98, at a fixed position of rotation of the turret 40, which is most clearly shown in FIG. 6 as the right horizontal position, a pair of driving clutch plates 97*a* and 98*a* (see FIG. 2) are arranged to be aligned with the driven clutch plates 97 and 98, respectively, of the particular pair of potentiometers which are positioned opposite this fixed position by the rotation of the turret housing 40. At any given time only one pair of the clutch plates 97, 98 are so positioned and control of engagement of the driving clutch plates 97*a*, 98*a* with the driven clutch plates 97, 98 is effected by means of the AM/FM band selection lever 101 (most clearly shown in FIG. 2).

In FIG. 2 the lever 101 is shown in its neutral position, and it may be moved either clockwise or counterclockwise to operate through a lever 102 on a clutch position lever 103 to move the clutch position lever 103 to the right or to the left. Extreme movements of the lever 103 are limited by a limit stop block 104 which is placed between a pair of tines projecting downwardly from the lever 103 as seen in FIG. 2. The right end of the lever 103 is pivotally connected to a clutch indexing lever 106 (see FIG. 3), which is pivoted at a point between a pair of clutch plate positioning pins 107 and 108, associated with the movable clutch plates 97*a* and 98*a*, respectively.

From an examination of FIG. 3, it can be seen that when the lever 103 moves to the right, the clutch plate positioning pin 107 also moves to the right with the pin 108 moving to the left. Conversely, when the lever 103 is moved to the left, the pin 108 moves to the right and the pin 107 moves to the left. Rightward movement of either of the pins 107 and 108 as viewed in FIGS. 2 and 3, causes the associated movable clutch plate 97*a* or 98*a* also to be moved toward the right into engagement with the corresponding clutch plate 97 or 98 on the associated AM or FM potentiometer to resiliently engage the cooperating clutch plate against the action of the spring 100.

The clutch plate positioning pins 107 and 108 are placed to ride in channels formed between the clutch plates 97*a* and 98*a* and respective spur gears 110 and 111. The shaft interconnecting the clutch plate 97*a* and the gear 110 establishes the channel for the clutch plate positioning pin 107 and the shaft interconnecting the clutch plate 98*a* and the spur gear 111 establishes the channel for receiving the clutch plate positioning pin 108. The movable clutch plates 97*a*, 98*a* are supported by openings just slightly larger than the clutch plates 97*a* and 98*a* in the end support bracket 44, and the shafts connected to the spur gears 110 and 111 are slidably supported in a support plate 78, so that the clutch plates 97*a* and 98*a* are axially moveable under control of the movement of the clutch plate positioning pins 107 and 108.

With the AM/FM selection lever 101 moved to its limit in the counterclockwise direction, the clutch plate 97*a* is biased into engagement with the corresponding aligned clutch plate 97 of the AM potentiometer rotated into position. With the AM/FM selection lever 101 moved to its limit in the clockwise direction, the clutch plates 97 and 97*a* are disengaged, and the clutch plates 98 and 98*a* for the FM potentiometer of the pair of aligned potentiometers are engaged.

A control of the thus-engaged clutch plates to effect rotation of the lead screw 93 of the potentiometer which is to be set or adjusted then is effected by rotation of the thumb wheel 70. As seen in FIG. 6, this causes rotation of the tuning shaft 120 which drives a crown gear 121 to rotate a cooperating crown gear 122 attached to the shaft of a driving spur gear 124, which engages the spur gears 110 and 111 to rotate them in the same direction. As a result, rotation of the appropriate spur gear 110 or 111, of the engaged movable clutch plate 97*a* or 98*a* effects rotation of the shaft 94 and the lead screw 93 of the potentiometer which is to be adjusted.

In order to hold the engaged clutch plates 97, 97*a* or 98, 98*a* into engagement with one another, a pair of detents 126 and 127 (FIG. 3) are provided on the clutch indexing lever 106. A bell crank lever 128 carries at one end thereof a clutch indexing detent wheel 129 which is urged into whichever one of the detents 126 or 127 is presented thereto to retain the selected position of the clutch plate indexing lever 106 after the AM/FM selection of lever 101 is released. In order to change the position of the clutch indexing lever 106, it is necessary to overcome the bias of the spring on the bell crank lever 128 to force the clutch indexing detent roller 129 out of the detent 126 or 127 when the indexing lever 106 is rotated to change the position of the clutch plates 97*a* and 98*a*.

Whenever it is desired to change the rotational position of the turret housing 40 to present a different pair of potentiometers to the clutch plates 97*a* and 98*a*, and at the same time to provide control for the tuning circuits of the receiver 30 from a different pair of potentiometers through the stepping switch 12, one of the pushbuttons 58 to 62 may be depressed, or if manual tuning of the pair of potentiometers associated with the manual tuning position is desired to be selected, the tuning shaft 120 is depressed toward the left as viewed in FIG. 6 against the action of the spring 71 to close the microswitch 69. If the selected microswitch 64 to 69 is not the one corresponding to the present position of the turret housing 40, the turret housing 40 is rotated in the manner described previously.

Energization of the clutch release solenoid 82 then causes the armature 130 to move to the left as viewed in FIG. 2. The armature 130 is connected to a clutch release lever 132 which extends upwardly as viewed in FIG. 2, and carries, at its upper end, an engaging plate 133. Movement of the engaging plate 133 to the left (FIGS. 2 and 3) under the operation of the clutch release solenoid 82 causes the plate 133 to abut against the clutch indexing lever 106 which is aligned with the surface of the plate 133 in the manner shown in FIG 3. This causes clutch indexing detent roller 129 to ride on the high point between the detent depressions 126 and 127.

With the clutch indexing lever 106 in the position shown in FIG. 3, both of the movable clutch plates 97*a* and 98*a* are in the position shown in FIG. 2 in alignment with one another and out of engagement with the corresponding clutch plates 97 and 98 carried by the potentiometers in the turret housing 40. Thus, the turret housing is free for rotation to a new position without any interference from the movable clutch plates **97*a* and 98*a*. When the new position is reached, the AM/FM selection lever 101 must be moved to the appropriate desired AM or FM position to engage the movable clutch plate 97*a* or 98*a* with the corresponding clutch plate 97 or 98** now associated with a different pair of potentiometers.

Thus, each set of potentiometers may be individually adjusted for each one of the pushbuttons 58 to 62. Once an initial adjustment of the potentiometers for each pushbutton position is made, however, further adjustments in the normal operation of the radio receiver are unnecessary; and merely depressing the desired pushbutton associated with the desired station, rotates the preset potentiometers into position and causes the operation of the stepping switch 12 to be such as to electrically connect the selected potentiometers into the circuit.

If desired, it is possible to utilize the linear movement of the tuning nuts 99 to provide a visual indication of the station to which a particular potentiometer is tuned with the position of the potentiometer tap being correlated with standard AM or FM tuning scale used in most radio receivers. This may be accomplished by attaching a pointer 150 to each of the tuning nuts 99 associated with the AM potentiometers 13 to 18 and by attaching a similar pointer 151 to the tuning nuts 99 associated with each of the FM potentiometers 23 to 28. These pointers 150 and 151 for each of the pairs of potentiometers then may be extended through the walls of the housing 40 so that they may be observed from the exterior of the housing 40.

Each of the pairs of pointers 150 and 151 move in slots 153 and 154, respectively, formed in the walls of the housing 40. The lengths of the slots 153 and 154 are sufficient to accommodate the maximum travel of the tuning nuts 99; and rotation of each of the pairs of potentiometers into the operating position shown in FIG. 6, causes alignment of a different pair of pointers 150 and 151 with an indicating window which may be provided in the front plate 45 of the tuning mechanism.

Movement of the AM/FM selection lever 101 may be ganged to the band selection switch 11 if desired to insure proper correspondence between these two switches. It also should be noted that the turret 40 could be arranged with the tuning potentiometers arranged radially of its axis of rotation instead of in parallel therewith, as shown, for use with receivers having differently shaped spaces for accommodating the mechanism.

I claim:

1. A tuning mechanism for a multiband wave signal receiver including in combination:
   - a turret capable of being rotated about an axis to a selected one of several discrete positions;
   - at least one group of tuning elements being mounted for a rotation with the turret, a different tuning element of the group being associated with each position of the turret;
   - first switching means for selecting the band to be controlled by the tuning mechanism; and
   - second switching means for electrically interconnecting the first switching means and the wave signal receiver with different ones of the tuning elements as the turret is rotated to different positions.

2. The combination according to claim 1, wherein the tuning elements each constitute a variable potentiometer.

3. The combination according to claim 2, wherein the turret is a cylindrical turret capable of being rotated about its central longitudinal axis and wherein the potentiometers are linear potentiometers aligned with the axis of the turret.

4. The combination according to claim 3, wherein a second group of linear potentiometers is provided for each rotational position of the turret, with the potentiometers of the first group being selected for connection to the wave signal receiver by the first switching means when the first switching means is in one state of operation, and with the potentiometers of the second group being selected for connection to the wave signal receiver by the first switching means when the first switching means is in another state of operation.

5. A tuning mechanism for a multiband wave signal receiver including in combination:
   - a turret capable of being rotated about an axis to a selected one of several discrete positions;
   - at least one group of tuning elements being mounted for rotation with the turret, a different tuning element of the group being associated with each position of the turret;
   - at least one other group of tuning elements, with a different tuning element of the other group being associated with each position of the turret;
   - adjusting means individual to each tuning element in each of the groups of tuning elements for adjusting the tuning elements; and
   - control means for selectively operating the adjusting means for one tuning element of each of said groups at the selected position of the turret.

6. The combination according to claim 5 wherein both of said groups of tuning elements are mounted to rotate with said turret with one tuning element from each group being associated with each discrete position of the turret to form a pair of tuning elements for each position, and further wherein the control means is mounted in fixed position with respect to the turret, so that different pairs of tuning elements are rotated into a position corresponding to the position of the control means upon rotation of the turret.

7. The combination according to claim 5, wherein the control means and the adjusting means each include mating mechanical drive means, with the control means having drive means individual to each group of tuning elements to engage and mate with the corresponding drive means of the adjusting means for the tuning element to be controlled.

8. The combination according to claim 5, further including means for rotating the turret, and means responsive to the operation of the turret rotating means for disengaging the control means from the adjusting means.

9. The combination according to claim 5, wherein both of the groups of tuning elements are mounted for rotation with the turret, with one tuning element of each group being associated with each position of the turret, and further wherein the tuning elements of at least one group are adjustable potentiometers each having a movable tap, with the adjusting means for each potentiometer adjusting the tap thereof.

10. The combination according to claim 9, wherein the adjusting means for each of the tuning elements includes a mechanical drive means, and wherein the control means includes corresponding mechanical drive means located at a fixed position relative to the turret, with rotation of the turret to different positions causing the drive means for different tuning elements in each of said groups of tuning elements to be located for engagement with corresponding drive means of the control means, with selection of the drive means of the control means causing engagement thereof with the drive means for the corresponding tuning element.

11. The combination according to claim 10, wherein the tuning elements of both groups of tuning elements are linear adjustable potentiometers and the turret is a cylindrical turret capable of being rotated about its central longitudinal axis, with the linear potentiometers being aligned with the axis in pairs for each rotational position, with one potentiometer from each group being in each of the pairs.

12, The combination according to claim 11, further including means for rotating the turret and means responsive to operation of the rotating means for disengaging the drive means of the control means from the corresponding drive means of the adjusting means.

13. In a multiband wave signal receiver, a tuning mechanism including in combination:
   - a turret capable of being rotated about its longitudinal axis to a selected one of several discrete positions;

two groups of tuning elements mounted for rotation with the turret, one element of each of the groups for each position of the turret, the elements for each position having a predetermined fixed relationship;

individual adjusting means for each tuning element for adjusting the tuning thereof;

control means located at a predetermined rotational position of the turret and having first and second engaging means corresponding to the adjusting means of the tuning elements of the two groups, respectively, for operating the adjusting means;

means for selectively engaging the first and second engaging means with the corresponding adjusting means, operation of the control means thereupon acting to adjust the tuning element with the engaged adjusting means.

14. The combination according to claim 13, further includes means for rotating the turret and means responsive to the operation of the rotating means for disengaging the engaging means from the adjusting means.

15. The combination according to claim 13 further including a plurality of pushbuttons each associated with a predetermined position of the turret; and means responsive to operation of a selected pushbutton for rotating the turret to the position corresponding to the selected pushbutton to locate the adjusting means for that position for selective engagement by the engaging means.

16. The combination according to claim 15, wherein one group of tuning elements is associated with a first signal band and the other group of tuning elements is associated with a second signal band and the first and second engaging means of the control means correspond to the first and second signal band, respectively, and further including switch means for selecting the group of tuning elements used to tune the wave signal receiver.

17. The combination according to claim 15, wherein the means responsive to the energization of a pushbutton includes an indexing solenoid with a pinion gear operating through a one way clutch for rotating the turret and with a rack gear operated by the armature of the solenoid being used to rotate the pinion gear a predetermined amount for each operation of the solenoid, the solenoid being operated through interupter contacts for releasing the solenoid after each operation thereof until the turret position corresponding to the selected pushbutton is reached, whereupon the solenoid remains deenergized.

18. The combination according to claim 15, wherein the tuning elements in each of the groups of tuning elements constitute linear potentiometers mounted in pairs, with one potentiometer from each pair being in each of the positions of the turret, the potentiometers each having an adjustable tap, with the adjusting means operating to adjust the positions of the taps.